Figure 1:
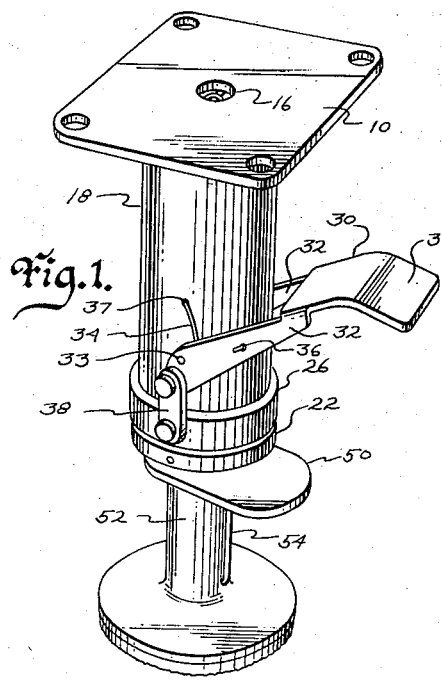

Sept. 9, 1958 F. R. WARD, JR 2,851,126
SPRING YIELDABLE ADJUSTABLE SUPPORT
Filed Aug. 1, 1956 2 Sheets-Sheet 1

Witness
Edward P. Seeley

Inventor
Frank R. Ward Jr.
by M. Talbert Dick
Attorney

Sept. 9, 1958 F. R. WARD, JR 2,851,126
SPRING YIELDABLE ADJUSTABLE SUPPORT
Filed Aug. 1, 1956 2 Sheets-Sheet 2
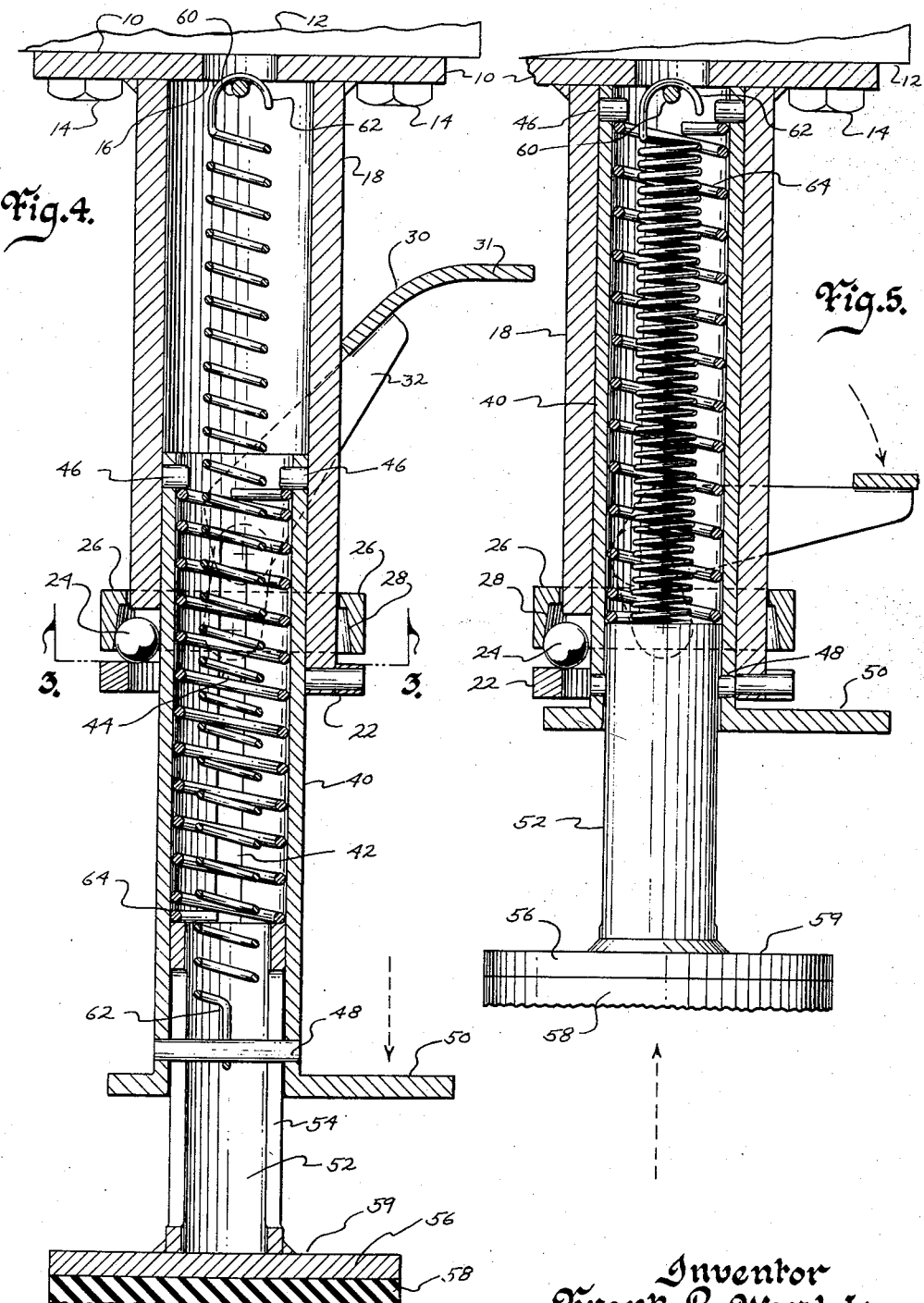
Inventor
Frank R. Ward Jr.
by M. Talbert Dick
Attorney
Witness
Edward P. Seeley

United States Patent Office 2,851,126
Patented Sept. 9, 1958

2,851,126

SPRING YIELDABLE ADJUSTABLE SUPPORT

Frank R. Ward, Jr., Edgewood, Iowa

Application August 1, 1956, Serial No. 601,414

2 Claims. (Cl. 188—5)

This invention relates to a brake or lock means for wheel supported warehouse trucks, scaffolding, machine assembly gigs and the like, and more particularly to a lock means which can be adapted to any wheeled unit and which can compensate for variations in size, flexibility and position of the wheeled unit.

Truck locks of various descriptions have long been adapted to many wheel supported units such as warehouse trucks and scaffolds. The function of these locks is to frictionally engage the floor below the wheeled unit and prevent the inadvertent movement of the unit when a stationary condition is desired. The truck locks known to me are generally secured to the bottom of a wheeled unit and the locks are equipped with means for engaging and disengaging the floor below the unit whenever desired. Some wheeled units are suspended on springs to create shock-absorbing action during loading, unloading and general operation of the unit. None of the truck locks known to me can be effectively used upon these spring suspended units. This is because a heavy load upon a spring suspended unit will force the chassis frame nearer the floor than usual. Then, if a locking device is brought into engagement with the floor, and then the wheeled unit is subsequently partially unloaded, the retracting springs on the unit lift the chassis frame to its normal height which lifts the locking device from its engagement with the floor. In short, the truck locking devices known to me cannot compensate for a change in height without a separate adjustment. Furthermore, many of the existing locking devices have gravity acting locking means and therefore are restricted to use in a vertical plane, whereas practical application of a truck lock often requires some inclination of the locking device. These same locking devices known to me often require a separate manual operation to extend them to a locking position and then to lock them in that position.

Therefore, one of the principal objects of my invention is to provide a truck lock that can be adapted to a spring suspended wheel unit and which can automatically compensate for any change in the compression of the spring suspension.

A further object of this invention is to provide a truck lock which can be adapted to use in any position.

A further object of this invention is to provide a truck lock which will automatically lock itself in any position to which it is extended.

Still further objects of my invention are to provide a truck lock that is economical in manufacture, durable in use, and refined in appearance.

These and other objects will be apparent to those skilled in the art.

Figure 2:
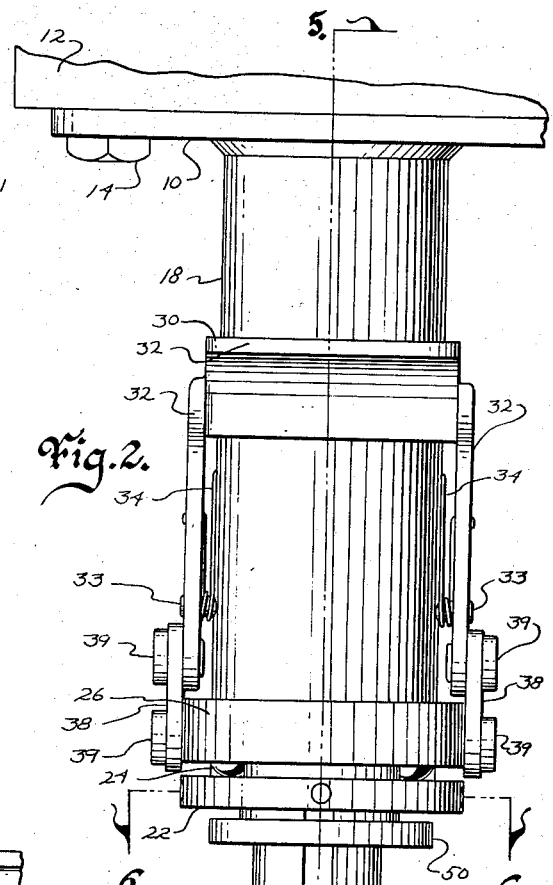
Figure 3:
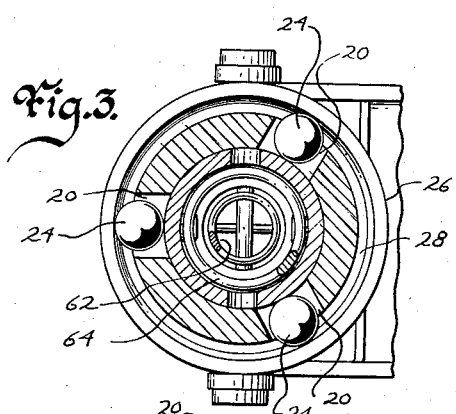
Figure 6:
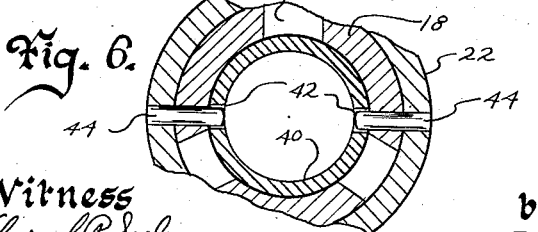

My invention consists in the construction, arrangements, and combination of the various parts of the device, whereby the objects contemplated are attained as hereinafter more fully set forth, specifically pointed out in my claims, and illustrated in the accompanying drawings, in which:

Fig. 1 is a perspective view of my device,

Fig. 2 is a front elevation of my device when attached to a truck frame which is only partially shown, Fig. 3 is a sectional view taken on line 3—3 of Fig. 4 and shows the details of the locking balls and the locking cup, Fig. 4 is a transverse sectional view of my device with the locking lever and locking apparatus in their locked position and the frictional foot member in an extended position and in engagement with the floor surface, Fig. 5 is a partial sectional view of my device taken on line 5—5 of Fig. 2 and shows the locking lever and locking apparatus in their released position and the frictional foot member in its retracted position, and Fig. 6 is a partial sectional view taken on line 6—6 of Fig. 2. Fig. 6 shows how two pins extend radially inward to the interior of the device and slidably engage the elongated slots of an inner tube member. The details of the spring assemblies have been omitted from this figure.

In these drawings I have used the numeral 10 to designate a base plate which can be secured to the spring-suspended chassis frame 12 of a wheel-supported warehouse truck or the like in any convenient manner such as by bolts 14. Access opening 16 exists substantially in the center of base plate 10 and cylindrical tube 18 is symmetrically placed over opening 16 and is rigidly secured to and downwardly extends from base plate 10. Disposed at the third points on the periphery of the lower end of tube 18 are slots 20 which extend along the longitudinal axis of tube 18 and which may be circular at their upper ends. Ring 22 is secured around the lower end of tube 18. Contained in slots 20 are locking balls 24 which have a diameter slightly greater than the wall thickness of tube 18. Locking cup 26 is loosely mounted around tube 18 and has a flange 28 whose inner surface is beveled outwardly and downwardly. The beveled flanges of cup 26 combine with ring 22 to retain locking balls 24 within slots 20. Locking lever 30 is comprised of pedal 31 and arms 32. Lever 30 is pivoted to tube 18 in any convenient manner such as by pins 33. Springs 34 are mounted on pins 33 and are operatively connected by their ends to holes 36 and 37 of arms 32 and tube 18, respectively, to maintain lever 30 in a normal, upward position as shown in Fig. 4. Linkage members 38 are pivotally connected by their ends to arms 32 and cup 26 in any convenient manner such as by pins 39. Linkage members 38 are pivoted to arms 32 in an offset position relative to pins 33 so that as lever 30 is rotated upon pins 33, relative vertical movement will be induced to the linkage members 38. Linkage members 38 are of such length that when locking lever 30 is in its elevated position, as shown in Fig. 4, locking cup 26 will be forced downward upon locking balls 24. Correspondingly, when locking lever 30 is released and extended in its lowered position as shown in Fig. 5, the locking cup 26 will be slightly elevated to release its pressure on locking balls 24. This phenomenon is aptly illustrated by observing the difference in the vertical distance between the ring 22 and cup 26 in Figs. 4 and 5.

Telescopically mounted within tube 18 is tube 40. Tube 40 has two oppositely disposed elongated slots 42 which engage pins 44 which extend radially into the interior of ring 22 and tube 18. The engagement of pins 44 in slots 42 is aptly shown in Fig. 6. Stop lugs 46 protrude into the interior of tube 40 at its upper end, and pin 48 extends through tube 40 at its lower end. Extending laterally from the bottom of tube 40 and generally underneath pedal 31 is foot pedal 50. Telescopically mounted within the lower end of tube 40 is tube 52. Tube 52 has two elongated slots 54 which slidably engage pin 48 of tube 40. The elongated slots 54 in tube 52 are shorter than the elongated slots 42 in tube 40. A plate member 56 is rigidly secured to the lower end of tube 52 and rubber pad 58 having an irregular, frictional outer surface is secured to the bottom side of plate member 56. Plate member 56 and rubber pad 58 comprise the frictional foot represented by the numeral 59 which is so vital to the successful operation of my device. Although not shown in the drawings, it is understood that frictional foot 59 could be pivotally secured to the tube 52 to better engage an irregular floor surface.

Pin 60 is rigidly secured across access opening 16. Suspended between pin 60 and pin 48 at the bottom of tube 40 is a spring member 62. Spring 62 approaches its normal static state as tube 40 extends its maximum distance into tube 18. Thus, spring 62 will yieldingly resist the extension of tube 40 from tube 18 and will retract tube 40 into tube 18 whenever the extending force being exerted upon tube 40 is released. Contained within the body of tube 40 is spring 64 which is restricted between the stop lugs 46 in the top of tube 40 and the upper end portion of tube 52. Spring 64 is of sufficient diameter to permit spring 62 to pass through its interior. Spring 64 approaches its normal static state when tube 52 is extended its maximum distance out of the lower end of tube 40, but is always under sufficient compression to maintain tube 52 in its maximum extended position while the frictional foot on tube 52 is not in frictional engagement with the floor.

The normal operation of my device is as follows: The truck lock in its operable position will appear as shown in Fig. 2 attached to the lower frame of a wheeled unit with the locking lever in its upward, locked position. When it is desired for the wheeled unit to be locked against movement, the foot of the operator is placed on pedal 50 of tube 40, thus forcing both tubes 40 and 52 downward out of tube 18 and spring 62 is stretched to its expanded condition as shown in Fig. 4. When the frictional foot 59 engages the floor, tube 52 stops its downward movement but tube 40 continues to move downward under the foot pressure of the operator to compress spring 64 above tube 52. It is to be noted even though the locking lever 30 has forced locking cup 26 down upon locking balls 24, the downward movement of tube 40 within tube 18 is not prohibited because the locking balls are not forced upward into frictional binding contact with the beveled flange 28 of the locking cup 26. However, when the operator removes his foot from pedal 50, spring 62 tries to contract and move tube 40 upward within tube 18. However, when the walls of tube 40 act to move locking balls upward, the balls create a rigid binding effect between the walls of tube 40 and the beveled flanges of locking cup 26. Thus, the locking balls prevent movement between tube 18 and tube 40 only in one direction.

When the operator has lowered pedal 50 to a point where spring 62 is expanded and spring 64 is compressed through the force of the floor acting upon frictional foot 59 and tube 52, the locking balls will act as described above and maintain the whole unit in its extended position in engagement with the floor surface. If the truck lock has been mounted on a spring suspended chassis, and this chassis is subjected to some vertical, upward movement because of loading or unloading conditions, the frictional foot 59 on my device will remain in frictional contact with the floor surface. The reason for this phenemenon can be seen by observing Fig. 4. Tube 18 is secured to the chassis frame and tube 40 is secured to tube 18 by the locking balls. Therefore, when the chassis frame and tubes 18 and 40 move vertically upward, compressed spring 64 will expand and continue to force tube 52 and frictional foot 59 downward to compensate for any upward displacement of the chassis frame of the wheeled unit. Furthermore, this action by the frictional foot 59 in compensating for the displacement of the chassis frame is completely automatic, and will prevent any such displacement of the chassis frame from unlocking the wheeled unit from its rigid engagement with the floor surface. It is apparent that my truck lock will perform in a similar manner whether it is disposed at any angle from the vertical. The maximum limit to which frictional foot 59 can compensate is measured by the length of slots 54 in tube 52.

When it is desired to move the "locked" wheeled unit, the operator needs only to push the locking lever 30 downward which will release the binding action of the locking balls 24 upon the walls of tube 40, and tube 40 will be retracted back into tube 18 by the spring 62. Since the elongated slots 42 in tube 40 are longer than the elongated slots 54 in tube 52, the vertical upward displacement of tube 40 will be greater than the vertical upward displacement of tube 52. This means that pin 48 in tube 40 will "pick up" tube 52 and negate any tendency of tube 52 to compensate for the upward vertical displacement of tube 40. It will be noted that tube 40 will always pick up tube 52 when tube 40 is "unlocked," because the vertical displacement of tube 40 will always be greater than the vertical displacement of tube 52. This is because tube 40 always continues downward to compress spring 64 after the downward motion of tube 52 has been stopped by the floor surface. Obviously, if tube 40 must travel farther than tube 52 when the device is placed in its extended operable position, then tube 40 will also travel farther than tube 52 as the device resumes its static position.

It is therefore apparent that my device can be successfully adapted to use upon wheeled units with spring suspended chassis frames, and that all of the other aforementioned objects of this invention have been attained.

I claim:

1. In a device of the class described, a base plate, a first tube rigidly mounted on said base plate, a second tube operatively slidably connected for limited slidable movement within said first tube, a spring means connecting said first and second tubes yieldingly resisting the extension of said second tube from the outer end of said first tube, a third tube operatively slidably connected for limited slidable movement within said second tube, said second tube being capable of greater slidable movement in said first tube than said third tube in said second tube, a spring means disposed between said second and third tubes to yieldingly keep said third tube in its maximum extended position from the outer end of said second tube, a means connected to said second tube for manually forcing said second tube into partial extension from the outer end of said first tube, a frictional member on the outer end of said third tube, slot openings in the lower side portions of said first tube, a locking cup having a flange extending outwardly from said first tube in a direction away from said base plate and being adjacent said slots, a locking ball in each of said slots and having a diameter greater than the thickness of the side portions of said first tube, and means for engaging said flange and said locking balls in binding engagement at times.

2. In a device of the class described, a base plate, a first tube rigidly mounted on said base plate, a second tube operatively slidably connected for limited slidable movement within said first tube, a spring means connecting said first and second tubes yieldingly resisting the extension of said second tube from the outer end of said first tube, a third tube operatively slidably connected for limited slidable movement within said second tube, said second tube being capable of greater slidable movement in said first tube than said third tube in said second tube, a spring means disposed between said second and third tubes to yieldingly keep said third tube in its maximum extended position from the outer end of said second tube, a means connected to said second tube for manually forcing said second tube into partial extension from the outer end of said first tube, a frictional member on the outer end of said third tube, slot openings in the lower side portions of said first tube, a locking cup having a flange extending outwardly from said first tube in a direction away from said base plate and being adjacent said slots, a locking ball in each of said slots and having a diameter greater than the thickness of the side portions of said first tube, and means for automatically engaging said flange and said locking balls in binding engagement at times.

References Cited in the file of this patent

UNITED STATES PATENTS

| | | |
|---|---|---|
| 1,183,107 | Norton | May 16, 1916 |
| 2,421,328 | Herold | May 27, 1947 |
| 2,712,366 | Skupas | July 5, 1955 |

FOREIGN PATENTS

| | | |
|---|---|---|
| 644,160 | France | May 29, 1928 |